May 30, 1950 J. J. SKELLEY 2,509,944
UNDULATING TRACK ROUNDABOUT
Filed Aug. 23, 1946 6 Sheets-Sheet 1
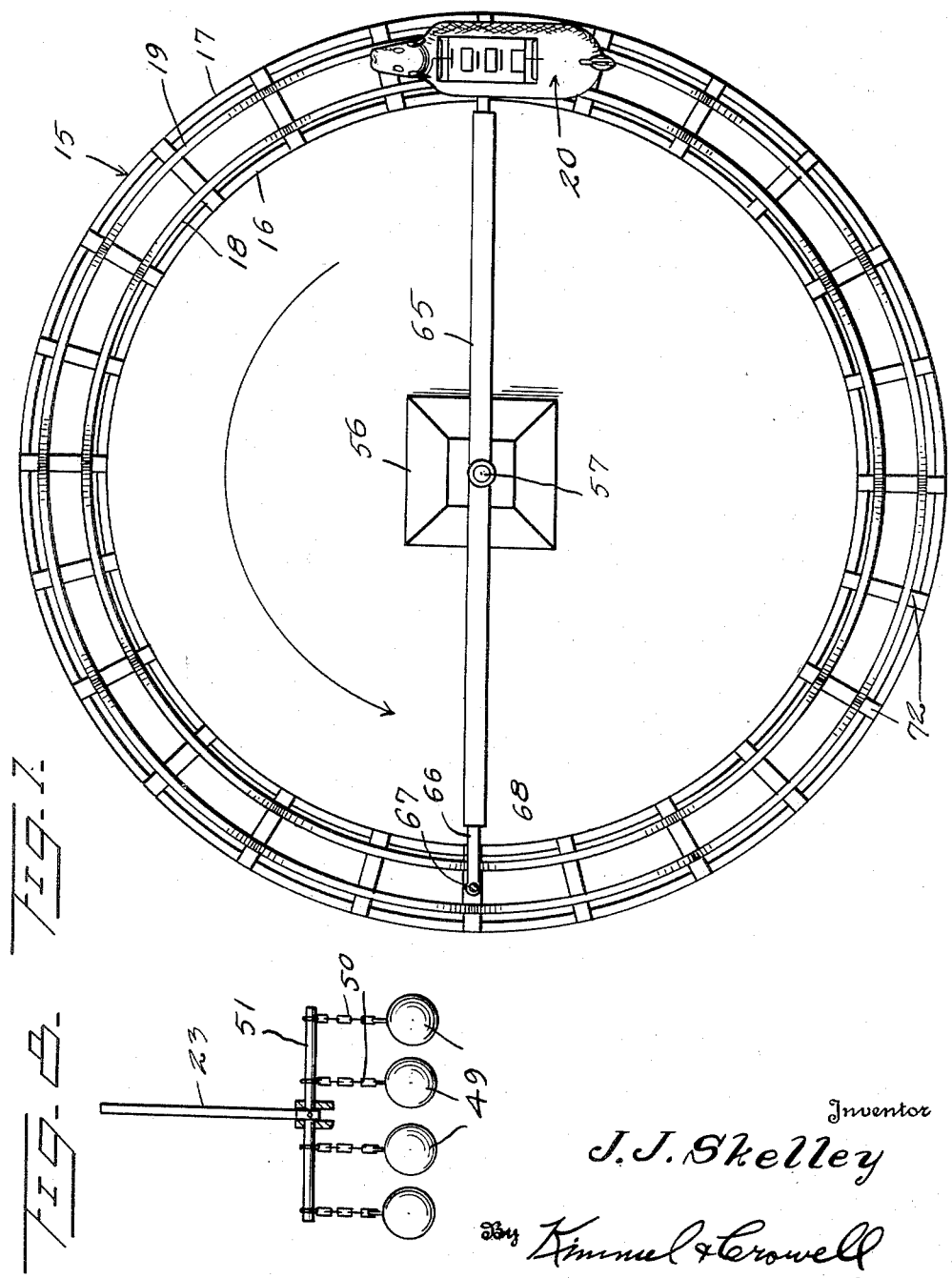
Inventor
J. J. Skelley
By Kimmel & Crowell
Attorneys May 30, 1950
J. J. SKELLEY
2,509,944
UNDULATING TRACK ROUNDABOUT
Filed Aug. 23, 1946
6 Sheets-Sheet 2
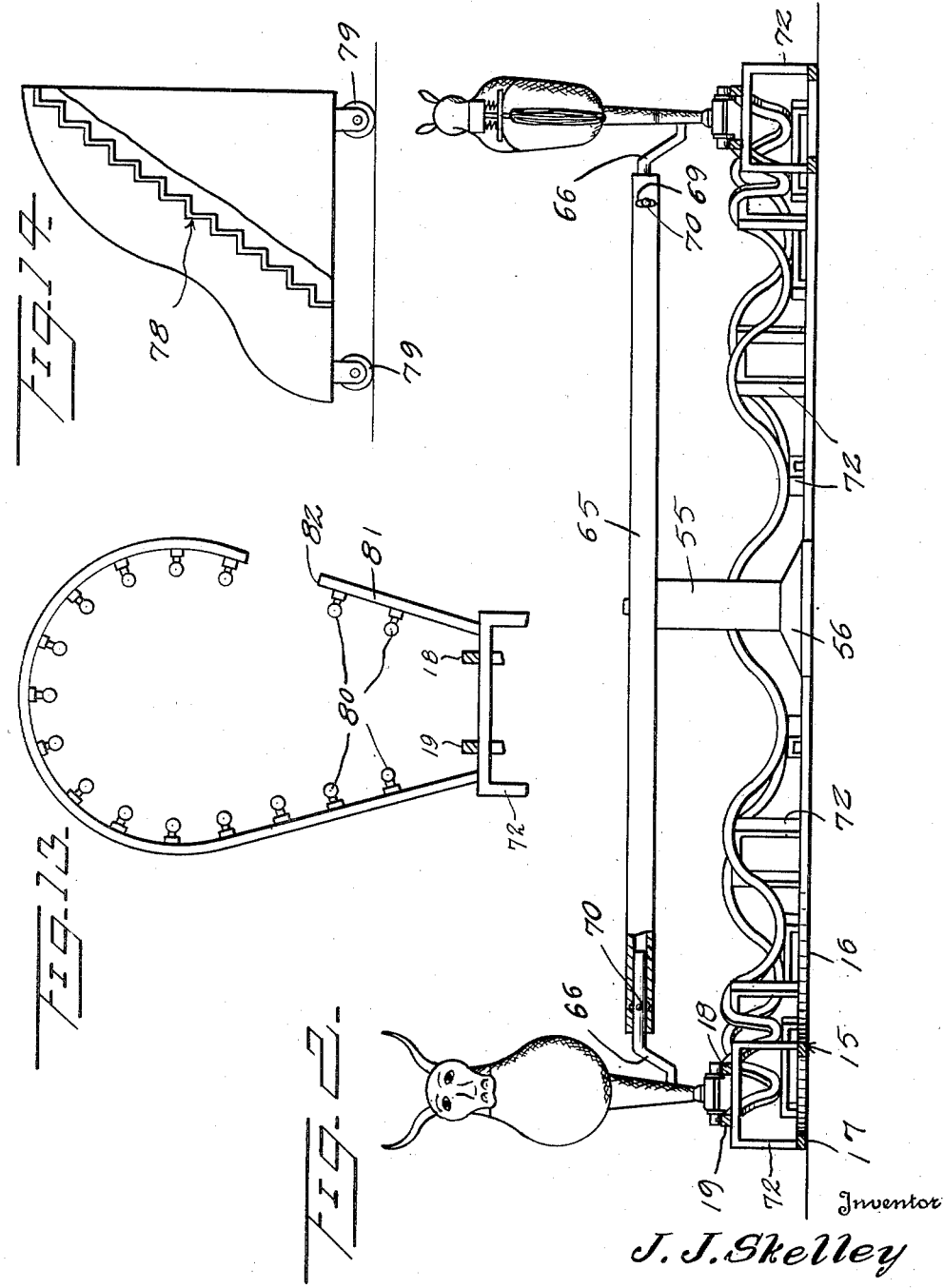
Inventor
J. J. Skelley
By Kimmel & Crowell
Attorneys

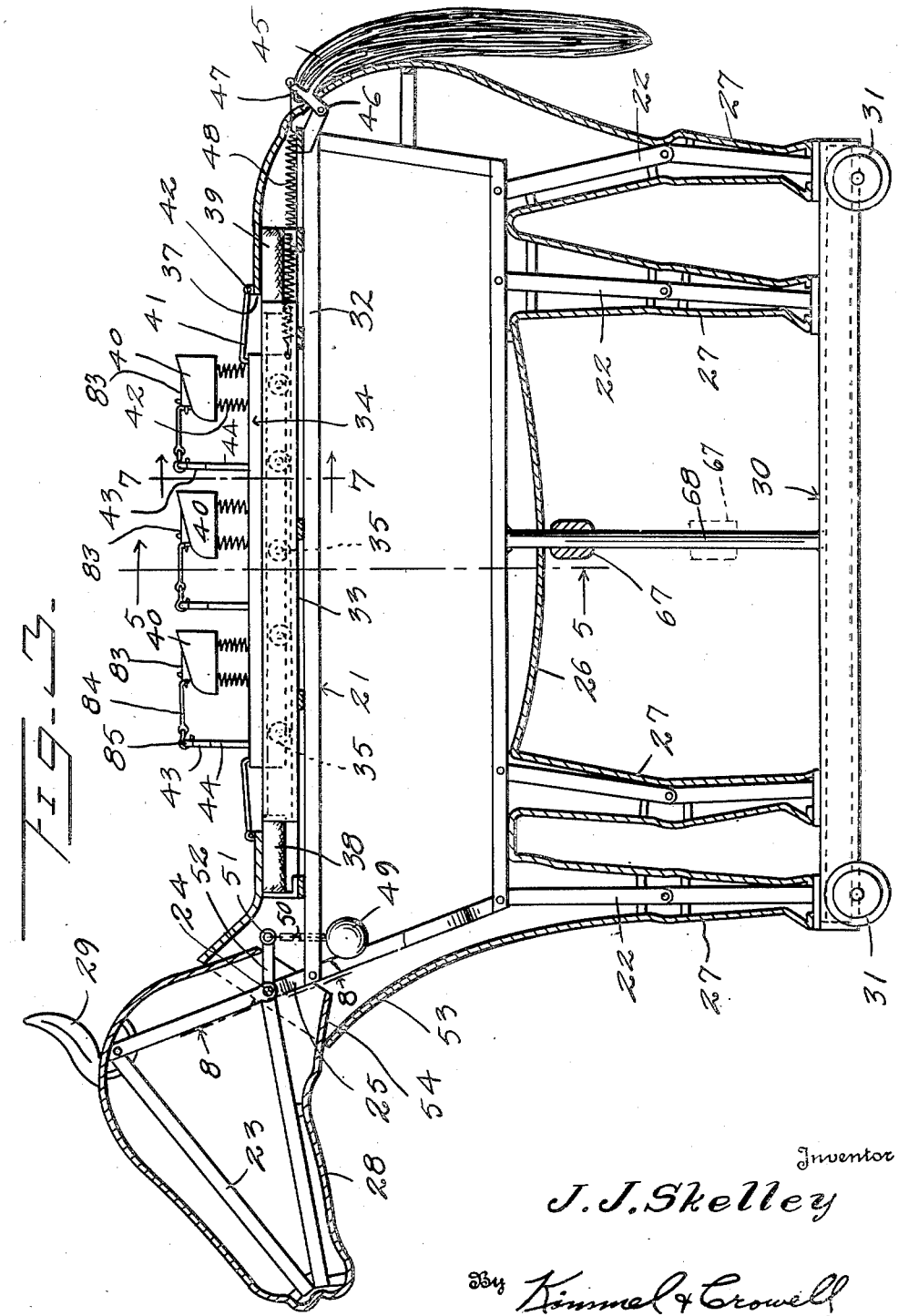

May 30, 1950 J. J. SKELLEY 2,509,944
UNDULATING TRACK ROUNDABOUT
Filed Aug. 23, 1946 6 Sheets-Sheet 4
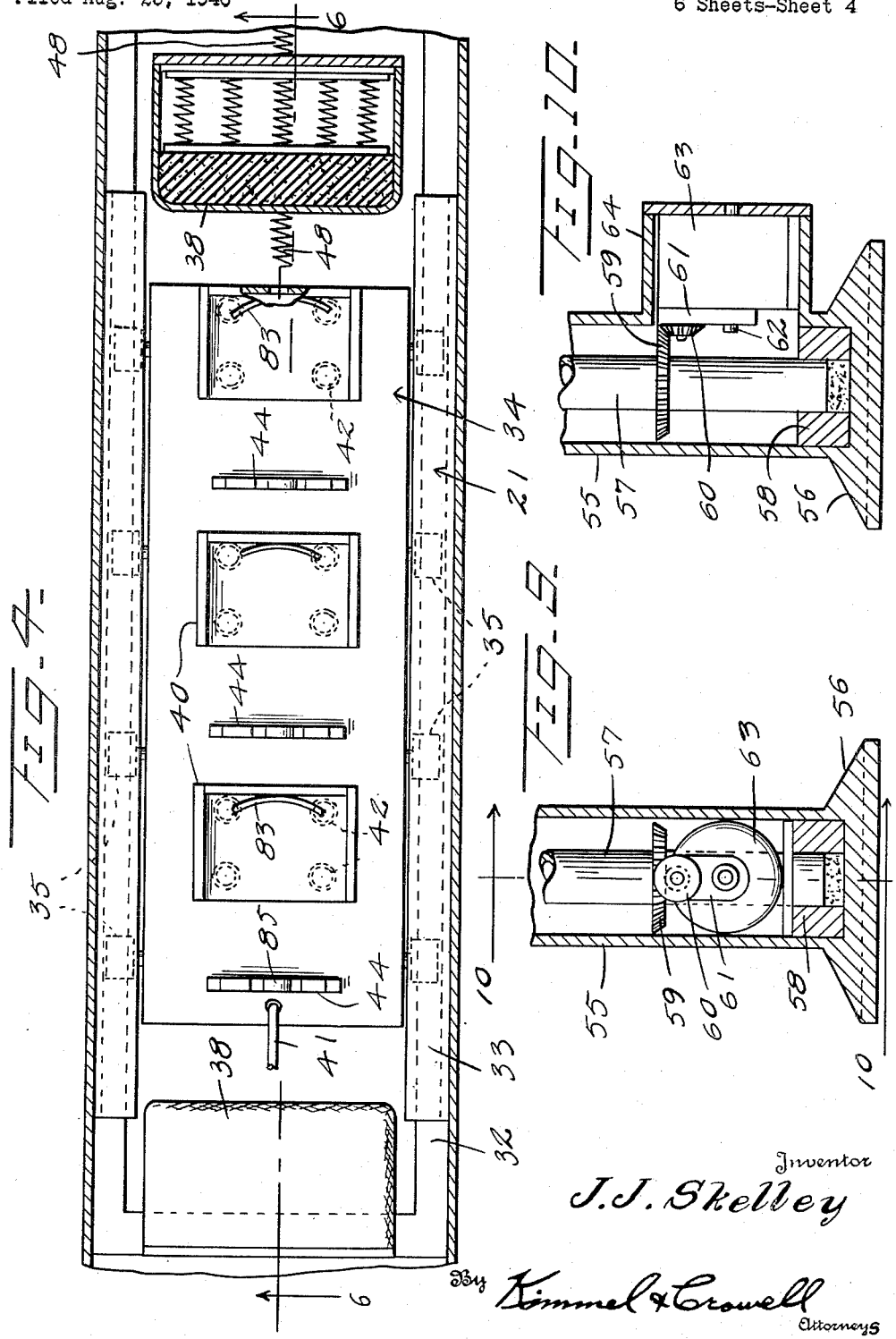

May 30, 1950 — J. J. SKELLEY — 2,509,944
UNDULATING TRACK ROUNDABOUT
Filed Aug. 23, 1946 — 6 Sheets-Sheet 5
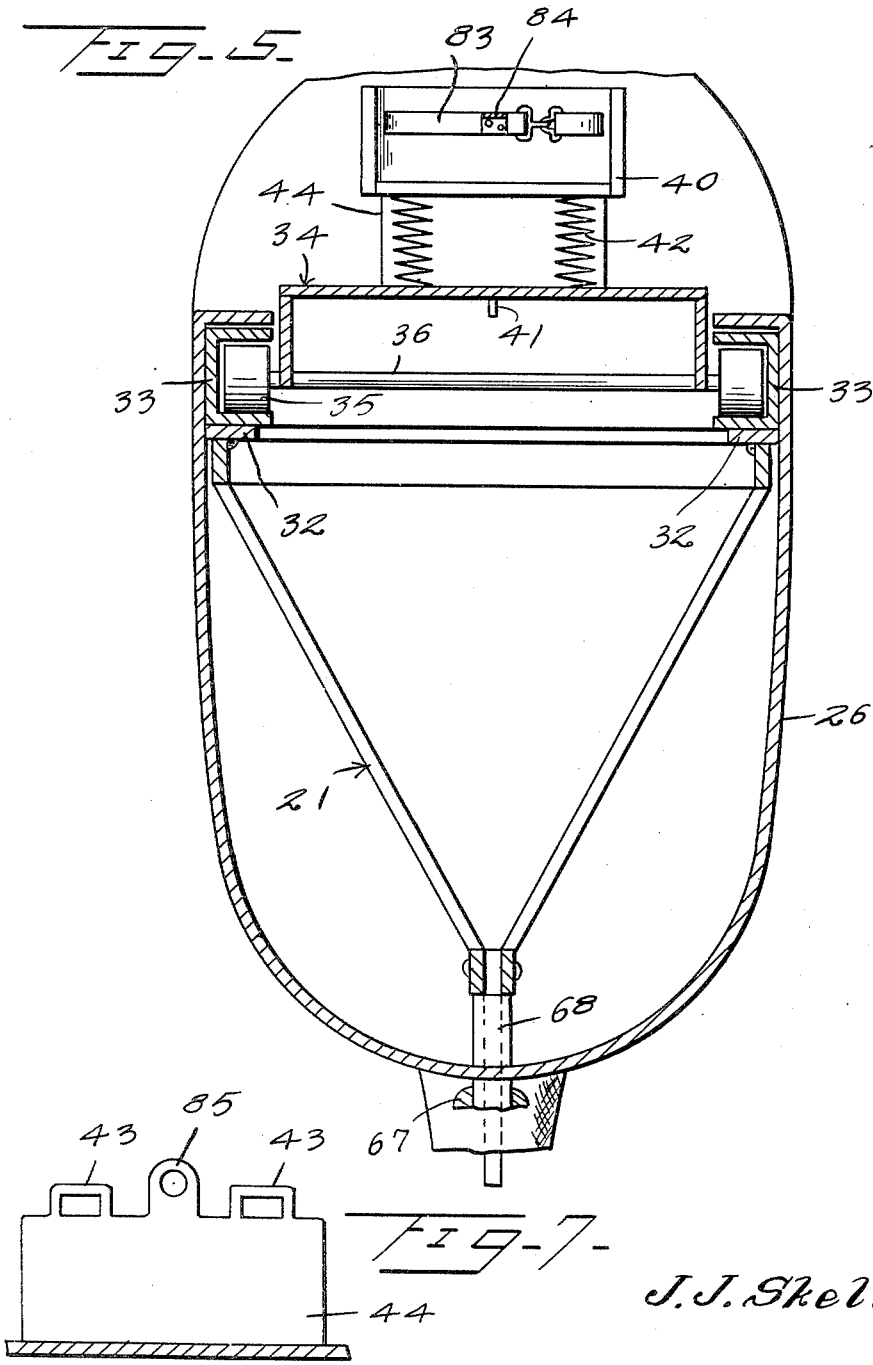
Inventor
J. J. Skelley
By Kimmel & Crowell
Attorneys May 30, 1950          J. J. SKELLEY          2,509,944
              UNDULATING TRACK ROUNDABOUT
Filed Aug. 23, 1946                     6 Sheets-Sheet 6
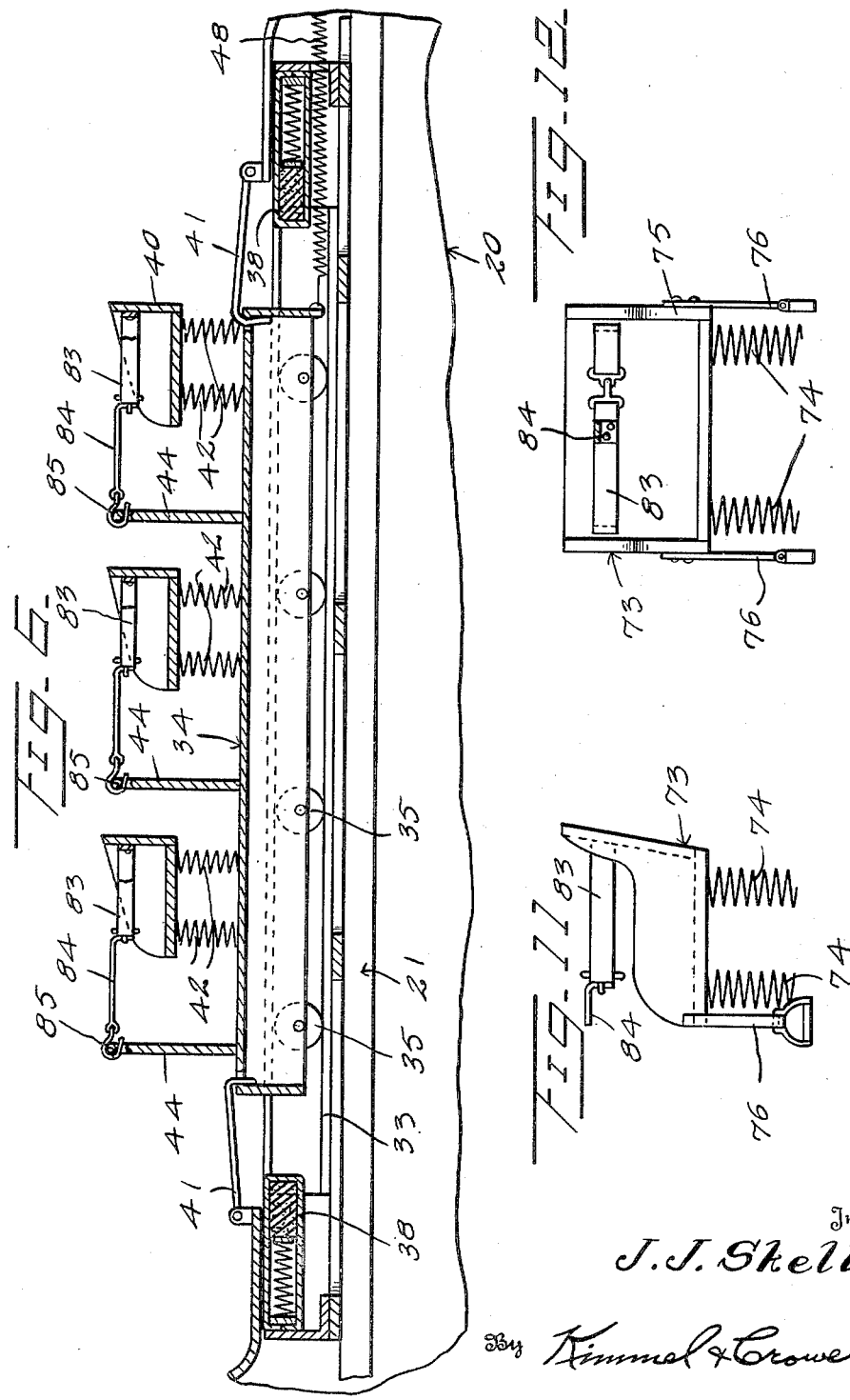
Inventor
J. J. Skelley
By Kimmel & Crowell
Attorneys Patented May 30, 1950

2,509,944

UNITED STATES PATENT OFFICE 2,509,944

UNDULATING TRACK ROUNDABOUT

Jack J. Skelley, Butte, Mont.

Application August 23, 1946, Serial No. 692,409

5 Claims. (Cl. 272—44)

This invention relates to amusement devices of the roundabout type.

An object of this invention is to provide an amusement device embodying a circular track of undulating configuration and at least a pair of carriers movable over the track, the carriers being in the form of simulated animals upon the backs of which the passengers are adapted to ride.

Another object of this invention is to provide an amusement device wherein the carriers are constructed in the form of animals which are of the animated type so that portions of the animals are adapted to move relative to the bodies as the animals move over the undulating track.

A further object of this invention is to provide in an amusement device of this kind, simulated animal carriages which include movable seats adapted to move back and forth as the carriage moves over the undulating track, the seats being connected to at least one part of the animal so as to move such part as the seat moves relative to the body.

A further object of this invention is to provide an amusement device embodying animated animals which are movable over an undulating track with the animals connected to a central driving means.

With the above and other objects in view, my invention consists in the arrangement, combination and details of construction disclosed in the drawings and specification, and then more particularly pointed out in the appended views.

In the drawings,

Figure 1 is a detail plan view of an amusement device constructed according to an embodiment of this invention, Figure 2 is a transverse sectional view of the device, Figure 3 is a longitudinal section through one of the animals, Figure 4 is a fragmentary plan view, partly in section, showing the mounting for the movable seat, Figure 5 is a sectional view taken on the line 5—5 of Figure 3, Figure 6 is a longitudinal section taken on the line 6—6 of Figure 4, Figure 7 is a fragmentary sectional view taken on the line 7—7 of Figure 3, Figure 8 is a fragmentary sectional view taken on the line 8—8 of Figure 3, Figure 9 is a fragmentary sectional view of the driving means, Figure 10 is a sectional view taken on the line 10—10 of Figure 9, Figure 11 is a detail side elevation of a modified form of the seat, Figure 12 is a detail front elevation of the seat shown in Figure 11, Figure 13 is a detail front elevation of a horseshoe shaped lighting means, Figure 14 is a detail side elevation, partly broken away, of the step or ladder construction for use by the passengers in getting onto the animals.

Referring to the drawings, and first to Figure 1, the numeral 15 designates generally a track construction which embodies inner and outer circular base members 16, 17 respectively. A pair of circular tracks 18, 19 are disposed above the base members 16, 17 and preferably these track members are of undulating configuration so as to provide up and down movement to the animals or carriages as the latter move about the tracks.

The tracks have movable thereover at least one pair of animated animals generally designated as 20. These animals may take the form of a horse, a bull, or some other animal, and each animal includes a frame structure 21 supported by means of supporting leg members 22. The frame structure 21 also includes a triangular shaped head frame 23 which is pivotally secured as at 24 to a front bar 25 carried by the body frame. The body frame is adapted to be covered by means of a body covering 26 which is shaped similar to the body of the animal which is thereby represented and the leg supporting members 22 are also covered by leg coverings 27.

A head covering 28 is adapted to enclose the triangular head frame 23 and may include ears 29. The legs 22 are mounted on a carriage 30 having wheels 31 which are adapted to engage the undulating tracks 18, 19. These wheels 31 are of flanged construction so as to prevent lateral movement of the animal as it is moved about the tracks.

The body frame 21 includes upper horizontal bars 32 which have fixed thereto channel shaped track members 33. The track members 33 are disposed with the channels in confronting relation and a seat carriage 34 is provided with rollers or wheels 35 engaging in the channel members 33. The wheels or rollers 35 are mounted on shafts 36 extending across the carriage 34.

The body covering 29 is formed with an elongated opening 37 in the upper side thereof and this opening is of a length to provide for the desired lengthwise movement of the seat carriage 34. The seat carriage 34 is adapted to be cushioned at the end of each lengthwise movement thereof by means of cushioned bumpers 38, 39.

At the time the passengers are mounting on the seats 40 carried by the seat carriage 34, the seat carriage is held against lengthwise movement by means of a pair of hooks 41 which are pivotally secured as at 42 to the upper side of the body covering 26. The seats 40 are spaced apart lengthwise of the seat carriage 34 and are preferably mounted on springs 42 so as to not only give a cushioning effect to the seats but also to provide up and down movement of the seats as the animals move over the undulated track.

The person seated in the seat may grasp a handle bar 43 carried by a support 44 which is fixed in upstanding relation to the seat carriage 34. The animal herein disclosed is provided with a movable tail 45 which is mounted on a bar 46 extending from the rear of the body frame 21. In order to provide up and down movement of the tail 45, as the animal moves over the track, and as the seat carriage 34 moves lengthwise of the channel shaped tracks 33, the tail supporting bar 46 is provided with an arm 47 pivotally mounted thereon which is connected to one end of an elongated spring 48. The other or forward end of the spring 48 is connected to the seat carriage 34. In this manner as the seat carriage 34 moves forwardly the spring 48 will be tensioned and the arm 47 will be rocked forwardly so as to thereby raise the tail. When the carriage moves back the spring 48 will be relaxed and the tail will drop to the normal position shown in Figure 3.

The head frame 23 is held in a substantially normal position by means of a plurality of weights 49 which are connected to a transverse bar 51 (Fig. 8) by chains 50, and the bar 51 is connected to a rearwardly extending arm 52 fixed relative to the head frame 23. The body covering 26 includes a neck covering 53 and the head covering 28 also includes a neck covering 54. The neck covering 54 which is carried by the head may be of flexible material and is adapted to telescope into the neck covering 53 which is carried by the body covering 26. As the body of the animal rocks up and down over the undulated track, the head will stay in its normal position by reason of the balancing thereof through the weights 49, but the rocking of the body will give the appearance of the head rocking up and down as the device moves over the track.

The several animated animals are adapted to be moved about the track by means of a driving construction which includes an upright hollow standard 55 carried by a centrally disposed base 56. The standard 55 has rotatable therein a vertically disposed shaft 57 journaled at its lower end in a bearing 58 carried by the base 56. The shaft 57 has fixed thereto a beveled gear 59 which meshes with a beveled gear 60 connected to a speed reducing means 61. The speed reducing means 61 is connected to a driving shaft 62 carried by a motor 63. The motor 63 is mounted in an offset housing 64 at the lower portion of the hollow standard 55.

The shaft 57 at its upper end has fixed thereto an elongated beam 65 and the beam 65 has loose in the opposite ends thereof bars 66 each formed with an eye 67 at its outer end which is slidable on a vertical bar 68 fixed between the animal and the carriage 30. The beam 65 is formed with a slot 69 within which a pin 70 loosely engages, the pin 70 being secured to a bar 66 so that the bar 66 will be held against endwise movement but permitted limited rotary movement. There are here shown two animals for movement over the undulated track structure, but it will, of course, be understood that there may be as many animals as may be desired. The undulating tracks are supported above the circular base members 16, 17, by means of U-shaped track supporting members 72.

Referring now to Figures 11 and 12, there is disclosed a modified form of seat structure embodying a seat 73 which is adapted to be connected to the seat carriage by means of springs 74. The seat 73 has depending from the opposite side walls 75 thereof stirrups 76.

Inasmuch as these animals are of relatively large construction, a step or ladder 78 is provided which is mounted on the wheels 79. The step structure is adapted to be moved alongside of the animal so that the passengers may walk up the steps and be seated in the seats 40 or 74.

The track structure may be illuminated by means of a series of lights 80 which are carried by a horseshoe shaped supporting frame 81 which is fixed relative to the track structure. The animals are adapted to move through the frame 81 as they move over the track. As shown in Figure 13, the horseshoe frame 81 is open as at 82 to provide for passage of the bars 66.

A waist strap 83 is carried by each seat 40 and includes a short strap 84 extending forwardly therefrom for engagement with an eye 85 carried by the support 44.

In the use and operation of this device, the passengers sit on the seats 40 and grasp the handles 43. The motor 63 is operated so as to rotate the shaft 57 and swing the beam 65. As the beam 65 swings in a circular path the animals will move therewith over the undulating tracks 18, 19 and as portions of the animals are of animated construction, the animals will give the appearance of animated motion as they move about the tracks.

When the animal dips down at the front end the seat carriage 34 which is loose in the channel tracks 33 will gravitatingly move forward until the forward end thereof strikes the forward bumper 38. When the front of the animal dips down the head will stay stationery, giving the appearance of the animal rearing its head and at the same time the tail 45 will be pulled upwardly. When the animal assumes the reverse position with the body inclined upwardly and forwardly, the carriage 34 will roll rearwardly until it strikes the rear bumper 39. At this time the tail 45 will drop down and the head will assume a lowered position with respect to the body.

I do not mean to confine myself to the exact details of construction herein disclosed but claim all variations falling within the purview of the appended claims.

What I claim is:

1. An amusement device comprising an undulated track, animal simulating members movable over said track, each member including a body, a pair of channel tracks carried by said body, a seat carriage having wheels engaging said channel tracks and movable lengthwise of said body in response to the undulation of the latter, a tail pivotally carried by said body, means connecting said tail with said seat carriage and adapted to rock said tail with movement of said seat carriage, resilient bumpers carried by said body against which said seat carriage is adapted to engage, and means for moving said animal members over said first track.

2. An amusement device comprising an undulated track, animal simulating members movable over said track, each member including a body, a pair of channel tracks carried by said body, a seat carriage having wheels engaging said channel tracks and movable lengthwise of said body in response to the undulation of the latter, a tail pivotally carried by said body, an arm fixed relative to said tail, an elongated spring connected between said arm and said seat carriage whereby said tail will rock with movement of said seat carriage, resilient bumpers carried by said body against which said seat carriage is adapted to engage, and means for moving said animal members over said first track.

3. An animal shaped amusement device comprising a body frame, a head frame pivotally carried by said body frame, means balancing said head frame, legs extending from said body frame, a mobile carriage fixed to said legs and adapted to be moved along an undulating track opposed channel-shaped tracks carried by said body frame, a seat carriage having wheels thereon engaging said tracks and movable relative to said body frame in response to the undulations of the latter, a seat on said seat carriage, a tail pivotally carried at the rear of said body frame, means connecting said tail with said seat carriage adapted to raise said tail whereby said tail will be raised with each forward movement of said seat carriage mounted on said body for free sliding movement lengthwise thereof.

4. An amusement device comprising an undulating track, animal simulating members movable over said track, each member including a body, a seat carriage mounted on said body for free sliding movement lengthwise thereof in response to undulation of the latter, a tail pivotally carried by said body, an arm fixed relative to said tail, and a connecting member between said arm and said seat carriage whereby said tail will rock with movement of said seat carriage relative to said body.

5. An amusement device comprising an undulating track, animal simulating members movable over said track, each member including a body, a seat carriage mounted on said body for free sliding movement lengthwise thereof in response to undulation of the latter, a tail pivotally carried by said body, an arm fixed relative to said tail, a connecting member between said arm and said seat carriage whereby said tail will rock with movement of said seat carriage relative to said body, a head pivotally mounted on said body, and means gravitatingly balancing said head on the pivot therefor, whereby said head will rock relative to said body upon movement of said member over said track.

JACK J. SKELLEY.

REFERENCES CITED

The following references are of record in the file of this patent:

UNITED STATES PATENTS

| Number | Name | Date |
|---|---|---|
| 127,174 | Lansing | May 28, 1872 |
| 381,187 | Tracy | Apr. 17, 1888 |
| 1,008,547 | Johnson | Nov. 14, 1911 |
| 1,182,682 | Hess | May 9, 1916 |
| 1,399,582 | Sayih | Dec. 6, 1921 |
| 1,512,972 | Zsarnay | Oct. 28, 1924 |
| 1,577,809 | Randall | Mar. 23, 1926 |
| 1,782,728 | Kiefer | Nov. 25, 1930 |

FOREIGN PATENTS

| Number | Country | Date |
|---|---|---|
| 125,250 | Switzerland | Apr. 2, 1928 |